(12) United States Patent
Doughty et al.

(10) Patent No.: US 10,822,044 B2
(45) Date of Patent: Nov. 3, 2020

(54) APPARATUS FOR STORING TWO WHEELED VEHICLES

(71) Applicant: HAWK NZ LIMITED, Auckland (NZ)

(72) Inventors: James Doughty, Auckland (NZ); James McNab, Auckland (NZ)

(73) Assignee: HAWK NZ LIMITED, Auckland (NZ)

( * ) Notice: Subject to any disclaimer, the term of this patent is extended or adjusted under 35 U.S.C. 154(b) by 0 days.

(21) Appl. No.: 16/334,274

(22) PCT Filed: Sep. 13, 2017

(86) PCT No.: PCT/NZ2017/050118
§ 371 (c)(1),
(2) Date: Mar. 18, 2019

(87) PCT Pub. No.: WO2018/052319
PCT Pub. Date: Mar. 22, 2018

(65) Prior Publication Data
US 2019/0233038 A1  Aug. 1, 2019

Related U.S. Application Data

(60) Provisional application No. 62/394,130, filed on Sep. 13, 2016.

(51) Int. Cl.
*B62H 3/08* (2006.01)
*E04H 6/00* (2006.01)
*B65D 85/68* (2006.01)

(52) U.S. Cl.
CPC ............ *B62H 3/08* (2013.01); *B65D 85/68* (2013.01); *E04H 6/005* (2013.01); *B65D 2585/6862* (2013.01); *B65D 2585/6865* (2013.01)

(58) Field of Classification Search
CPC ... E04H 6/02; E04H 6/005; B65D 2585/6865; B65D 2585/6862; B62H 3/08
See application file for complete search history.

(56) References Cited

U.S. PATENT DOCUMENTS

| 542,096 A | * | 7/1895 | Mumford | B62H 3/04 |
| | | | | 217/37 |
| 3,682,523 A | * | 8/1972 | Esposito | B62H 3/08 |
| | | | | 312/198 |

(Continued)

FOREIGN PATENT DOCUMENTS

| EP | 3326894 A1 | * | 5/2018 | ............... B62H 3/08 |
| FR | 1068931 A | * | 7/1954 | ............. E04H 6/005 |

*Primary Examiner* — Christine T Cajilig
(74) *Attorney, Agent, or Firm* — Weiss & Moy, P.C.; Jeffrey D. Moy

(57) ABSTRACT

An apparatus for storing a two wheeled vehicle (e.g. a bicycle, electric bicycle or motorcycle etc) having: a housing adapted to receive a two wheeled vehicle and having a door connected to it at one end which is movable between a closed configuration and an open configuration; at least one base support for a two wheeled vehicle; and at least one wheel securing means; the apparatus adapted such that when in use a user is able to open the door and push a two wheeled vehicle into the housing such that the base support receives, guides and engages parts of the wheels of the vehicle and the wheel securing means engages and secures part of a wheel with the result that the vehicle is securely held upright during storage in the apparatus.

14 Claims, 18 Drawing Sheets

(56) References Cited

U.S. PATENT DOCUMENTS

| | | | |
|---|---|---|---|
| 3,734,272 A * | 5/1973 | Galen | B65D 85/68 |
| | | | 206/335 |
| 3,949,528 A * | 4/1976 | Hartger | E04H 6/005 |
| | | | 52/79.1 |
| 4,242,846 A | 1/1981 | Hurd et al. | |
| 5,921,043 A * | 7/1999 | McDonald | E04B 1/34331 |
| | | | 52/309.11 |
| 8,820,004 B1 | 9/2014 | Jeffords | |
| 9,908,576 B2 * | 3/2018 | McPherson | B62H 3/08 |
| 2002/0095960 A1 | 7/2002 | Grover | |
| 2005/0183385 A1 * | 8/2005 | Ohanesian | B28B 7/0073 |
| | | | 52/782.1 |
| 2007/0158975 A1 * | 7/2007 | Atchison | B62H 3/08 |
| | | | 296/182.1 |
| 2015/0102714 A1 | 4/2015 | Gonzalez Hernandez et al. | |
| 2016/0168843 A1 | 6/2016 | Bell | |

* cited by examiner

101

APPARATUS FOR STORING TWO WHEELED VEHICLES

FIELD OF INVENTION

The invention generally relates to an apparatus for storing two wheeled vehicles. More particularly but not exclusively the invention relates to an apparatus for storing bicycles, electric bicycles and/or motorbikes.

BACKGROUND

Two wheeled vehicles such as high end bicycles can easily be damaged when they are being stored or transported. Additionally, when these vehicles are being stored outside they are at risk of environmental damage and/or being stolen or vandalised.

It is an object of a preferred form of the present invention to go at least some way towards addressing at least one of the above problems. While this is an object of a preferred embodiment, it should not be seen as a limitation on the scope of the invention as claimed. The object of the invention per se is simply to provide the public with a useful choice.

The term "comprising" and derivatives thereof, e.g. "comprises", if and when used herein in relation to a combination of features should not be taken as excluding the possibility that the combination may have further unspecified features. For example, a statement that an arrangement "comprises" certain parts does not mean that it cannot also, optionally, have additional parts.

It is intended that any reference to any range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example: 2 to 8, 1.5 to 5.5 and 3.1 to 4.7).

SUMMARY OF THE INVENTION

According to one aspect of the invention there is provided an apparatus for storing a two wheeled vehicle (e.g. a bicycle, electric bicycle or a motorcycle etc) having:
- a housing adapted to receive a two wheeled vehicle and having a door connected (e.g. by a hinge assembly etc) to it at one end which is movable between a closed configuration and an open configuration;
- at least one base support for a two wheeled vehicle; and
- at least one wheel securing means;
- the apparatus adapted such that when in use a user is able to open the door and push a two wheeled vehicle into the housing such that the base support receives, guides and engages pants of the wheels of the vehicle and the wheel securing means engages and secures part of a wheel with the result that the vehicle is securely held upright during storage in the housing.

Preferably the base support is removable, has a wheel engaging channel and has felt inserts in the wheel engaging channel.

Preferably the housing has at least one bracket adapted to support the base support.

Preferably the wheel securing means is located against an inner back wall of the housing.

Preferably the wheel securing means is removable, is a two part wheel wedge and has felt inserts on the side walls of the wedges.

Preferably the door pivot upwards with respect to the housing.

Preferably the apparatus has a locking means adapted to lock the door to the housing.

Preferably the locking means comprises a lock and latch and a keypad.

Preferably the apparatus has at least one battery.

Preferably the apparatus has an electric bike battery charger.

Preferably the apparatus has at least one light inside the housing.

Preferably the apparatus has at least one solar panel.

Preferably the housing consists of a top panel side wall panels and an end wall panel.

Preferably the housing has a floor panel.

Preferably the panels and the door both have a structural core with sandwich type construction (e.g. panels of foam) and wherein the core is covered on both sides with a protective skin.

Preferably the structural core is made substantially from thermoplastic foam.

Preferably the skin is made substantially from E-glass, UV stabilized epoxy, gelcoat and/or clear carbon.

Preferably the apparatus has removable outer panels connected to the outer side walls of the housing and the outer panels are adapted to releasably engage with the housing.

Preferably the apparatus has removable panels lining the inner side walls of the housing.

Preferably the inner and outer panels are made substantially from PET fibre.

Preferably the apparatus is substantially weatherproof.

Preferably the apparatus is substantially waterproof.

Preferably the apparatus can store more than one two wheeled vehicle.

Preferably the two wheeled vehicle is a bicycle, electric bicycle or motorcycle.

Preferably the apparatus is modular.

These and other features, objects and advantages of the present invention will be readily apparent to persons of ordinary skill in the art upon reading the entirety of this disclosure, which includes the accompanying drawings.

BRIEF DESCRIPTION OF THE DRAWINGS

Some preferred embodiments of the invention will now be described by way of example and with reference to the accompanying photos and drawings, of which.

DETAILED DESCRIPTION

In a preferred embodiment of the invention there is provided an apparatus for storing a two wheeled vehicle or vehicles. References to two wheeled vehicles throughout the specification relate to bicycles (especially high end sports bicycles), electric bicycle and motorcycles including dirt bikes, mopeds etc.

Figure 1:
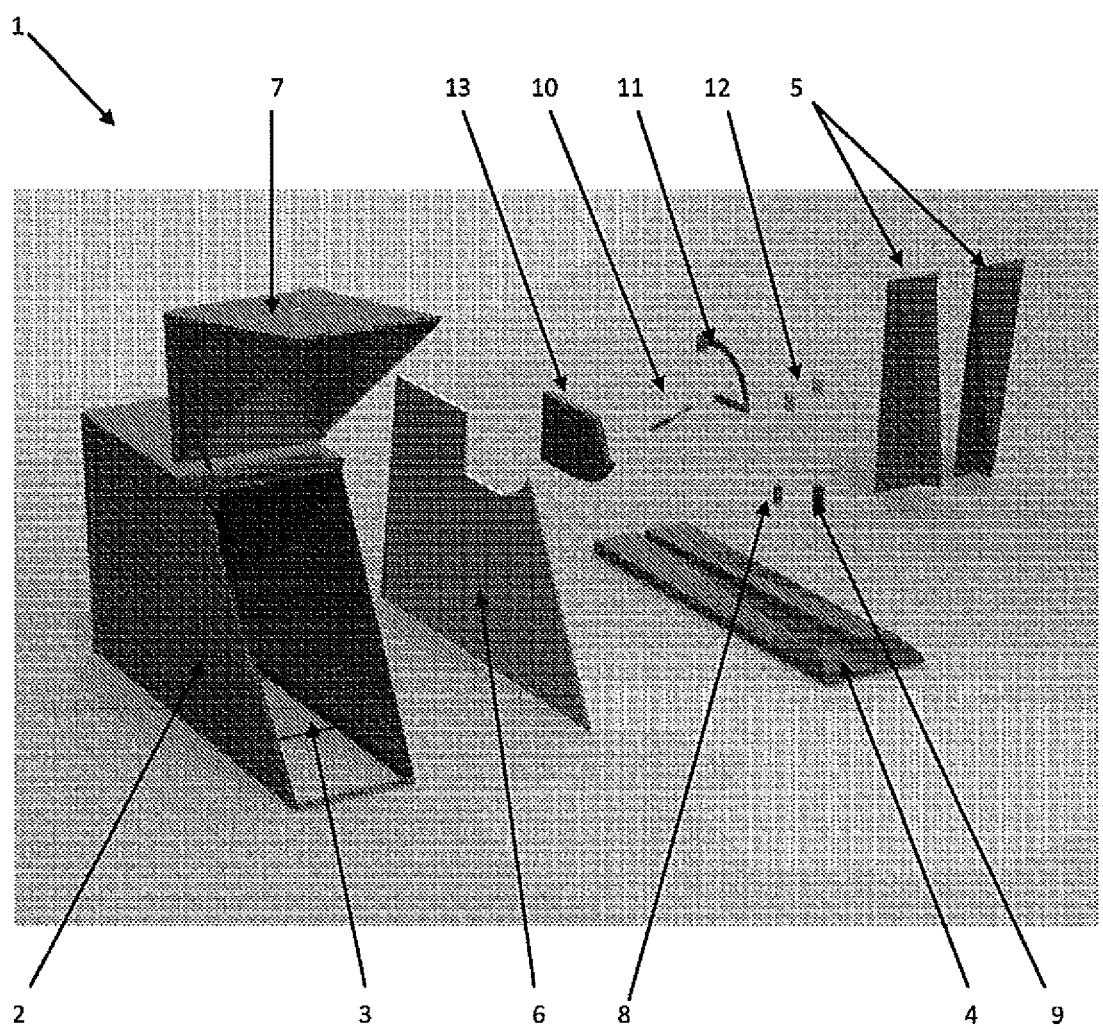
FIG. 1 is a top perspective exploded view of one embodiment of an apparatus for storing a two wheeled vehicle.

FIG. 1 shows an apparatus 1 for storing a two wheeled vehicle (not shown). As can be seen the apparatus 1 has housing 2 adapted to receive a two wheeled vehicle (not shown). In the embodiment shown the apparatus 1 stores one two wheeled vehicle however it will be appreciated that in some embodiments more than one two wheeled vehicle can be stored. The housing 2 can come in different shapes and sizes but is preferably rectangular in shape and about 1180 mm in height 612 mm in width and 2032 mm in length (of the base). The housing 2 is also preferably made up of side panels, a top panel and an end panel. Although not visible the housing 2 can have feet and/or ground attachment holes. The housing 2 also has brackets or supports 3 at its base for supporting a movable base support/tray 4 (preferably VAC formed) which fits within the housing 2 along with a two part wheel wedge 5 (preferably VAC formed) which fits against the inner back end of the housing 2 when in use. The base support/tray 4 is preferably about 2010 mm in length and 540 mm in width. As can be seen the base support/tray 4 is adapted to receive (e.g. has a track or channel) a wheel or wheels or part thereof of a bicycle to help keep the bicycle securely upright when in use and stored within the housing. The base support/tray 4 can come in different sizes depending on the wheel size of the two wheeled apparatus and can be made from a number of different materials such as fibreglass etc. The wheel wedge 5 is adapted to engage and secure a wheel or part thereof (preferably the back wheel) of a bicycle or motorcycle to assist with securely holding the bicycle upright during storage or transport. The wheel wedge 5 will come in different sizes depending on the size of the wheel and can be made from a number of different materials such as fibreglass etc. Those skilled in the art will appreciate that other types of wheel securing means can be used instead at a wheel wedge 5 and it can be located in different positions within the housing 2 instead of against a back inner wall of the housing 2. Both the wedge 5 and base support/tray 4 are preferably removable however in some embodiments they can be fixed to the housing 2. In some embodiments both the support 4 and wedge 5 can have magnets as can the housing 2 to help correctly position the support 4 and wedge 5 are removed from the housing 2 and are being placed back inside. In alternative embodiments the support 4 and wheel wedge 5 can be a one piece part. The apparatus 1 can also have a storage compartment or compartments (not shown) which can come in different shapes and sizes and in some embodiments the storage compartment can be created by an inner dividing wall in the housing 2.

In embodiments (not shown) in which at least two wheeled vehicles are stored in the apparatus 1, the apparatus 1 preferably either has a single support which can receive two or more vehicles and a wheel securing means capable of securing two or more vehicles or at least two supports 4 and wedges 5 and optionally there can be an inner dividing wall between the supports 4 and wedges 5.

Lining the inner walls of the housing 2 when assembled are interior panels (preferably PET fibre) 6 and the number and shape of these can vary. At the front end of the housing 2 is a hinged door 7. The door 7 has a locking assembly consisting of lock and latch 8 and a lock keypad 9 to lock the door 7 to the housing 2. The lock 8 and keypad 9 are preferably positioned halfway up the door 7 and the lock keypad 9 is preferably flush mounted on the door 7 although those skilled in the art will appreciate that the lock 8 and keypad 9 can be positioned in different areas or a different type of lock assembly (e.g. lock and key) can be used. The advantage of having the lock 8 and keypad 9 at least halfway up the door is that it minimises the chance of potential water/flood damage. The keypad 9 is powered by a battery, batteries and/or a battery pack (not shown) and preferably has a manual override option. In some embodiments the door 7 and/or housing 2 have very subtle divot points (or location points) on the outside surface which allows for locating the position of the locking assembly and its weak points such that a certified maintenance person or supplier will be able to punch through to release or remove the lock 8 if there is no other way in. In a particularly preferred embodiment of the invention the lock assembly is waterproof or water resistant. The battery, batteries or battery pack can be directly wired into power cables or they can be rechargeable, replaceable (e.g. AAA batteries etc) and/or solar powered. The battery can power the lock 8 and keypad 9 and in some embodiments the apparatus 1 can have lights (e.g. lengthwise LED strip lights etc) inside and/or outside the housing 2 which the battery can also power. In use the lights make it easier for a user to load and unload a bicycle. In embodiments where the battery is solar powered the apparatus 1 can have attached solar panels preferably about 230 mm×430 mm in size. In some embodiments the battery or module housing the batteries are installed at the back (end opposite the door) of the housing. The apparatus 1 can also have a battery or power indicator on the outside of the housing 2.

In some embodiments the apparatus 1 can have an electric bike battery charger not shown) such that an electric bicycle can be charged whilst it is stored within the housing 2 and the apparatus 1 can be adapted to receive power from a mains electricity supply to charge the electric bike battery charger or provide power to lights, lock 8 and keypad 9 etc. In an alternative embodiment the apparatus 1 can have an alarm system (not shown) and/or a smoke alarm (not shown).

Figure 2:
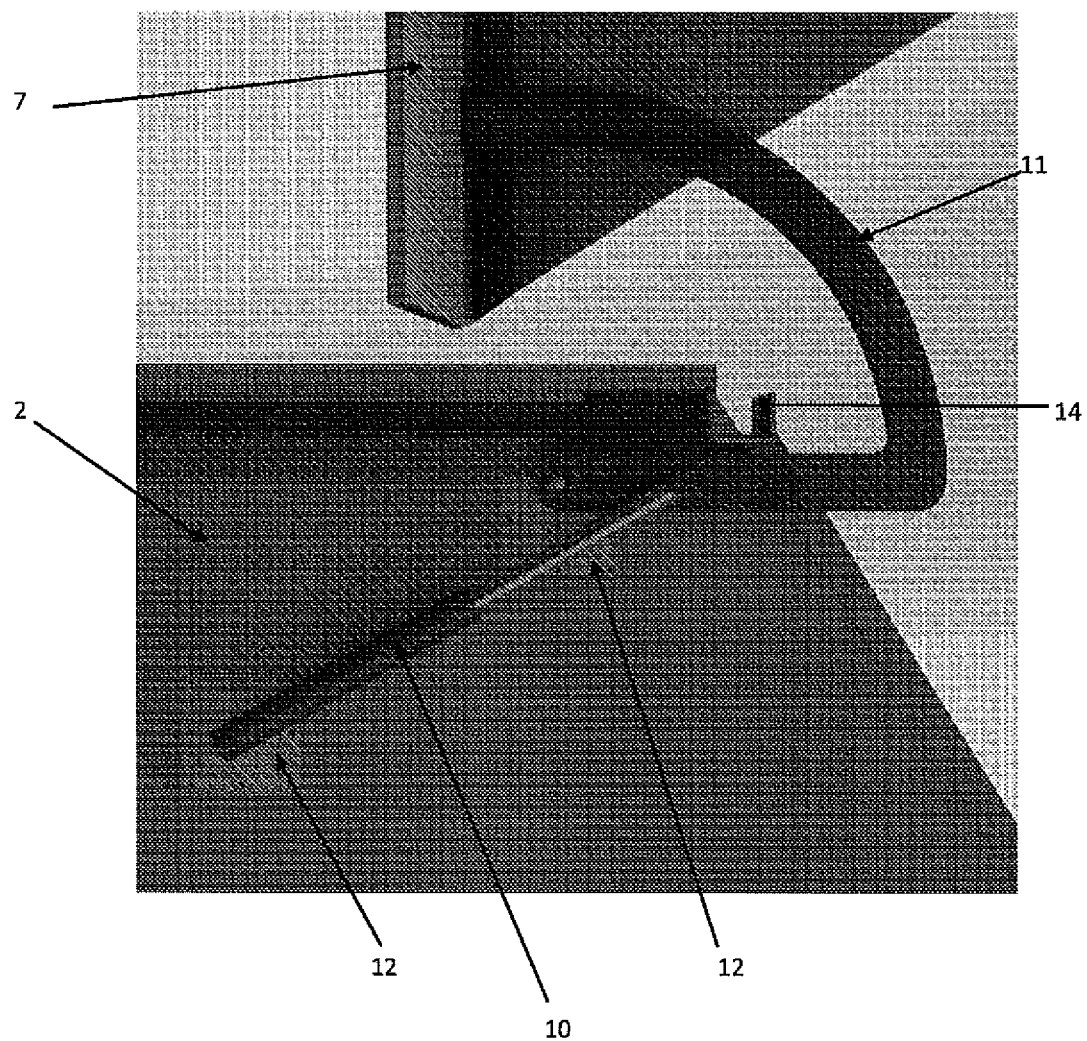
FIG. 2 is a side view of housing to door connection which forms part of the apparatus shown in FIG. 1 with the door in an open configuration.
Figure 3:
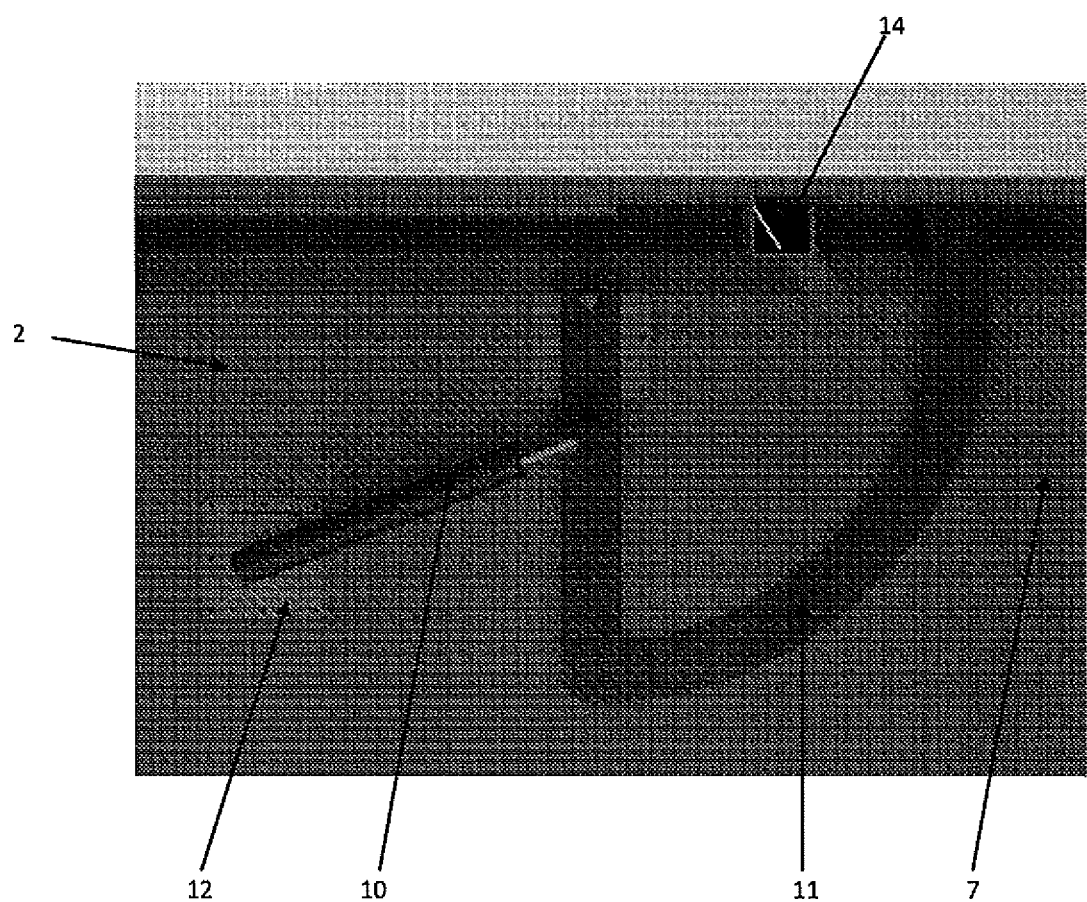
FIG. 3 is a side view of the housing to door connection shown in FIG. 2 with the door in a closed configuration.

The door 7 and housing 2 connection has two gas struts 10, two hinge brackets 11, two hinge hard plates 12 and two hinge and strut covers 13. FIGS. 2 and 3 show the door 7 and housing 2 connection in more detail when the door 7 is in an open and a closed position/configuration. As can been seen the hinge hard plates 12 are fastened to the housing 2 with bolts or the like and the hinge brackets 11 which are preferably made from stainless steel are attached directly to the door 7 at one end via a hard point embedded in the door 7. Those skilled in the art will appreciate that other types of door 7 to housing 2 connections can be used and instead of pivoting upwards the door 7 could open sideways. As also can be seen in both drawings the edge of the housing 2 has a gutter 14 which runs the entire opening at the top of the housing 2.

Figure 4:
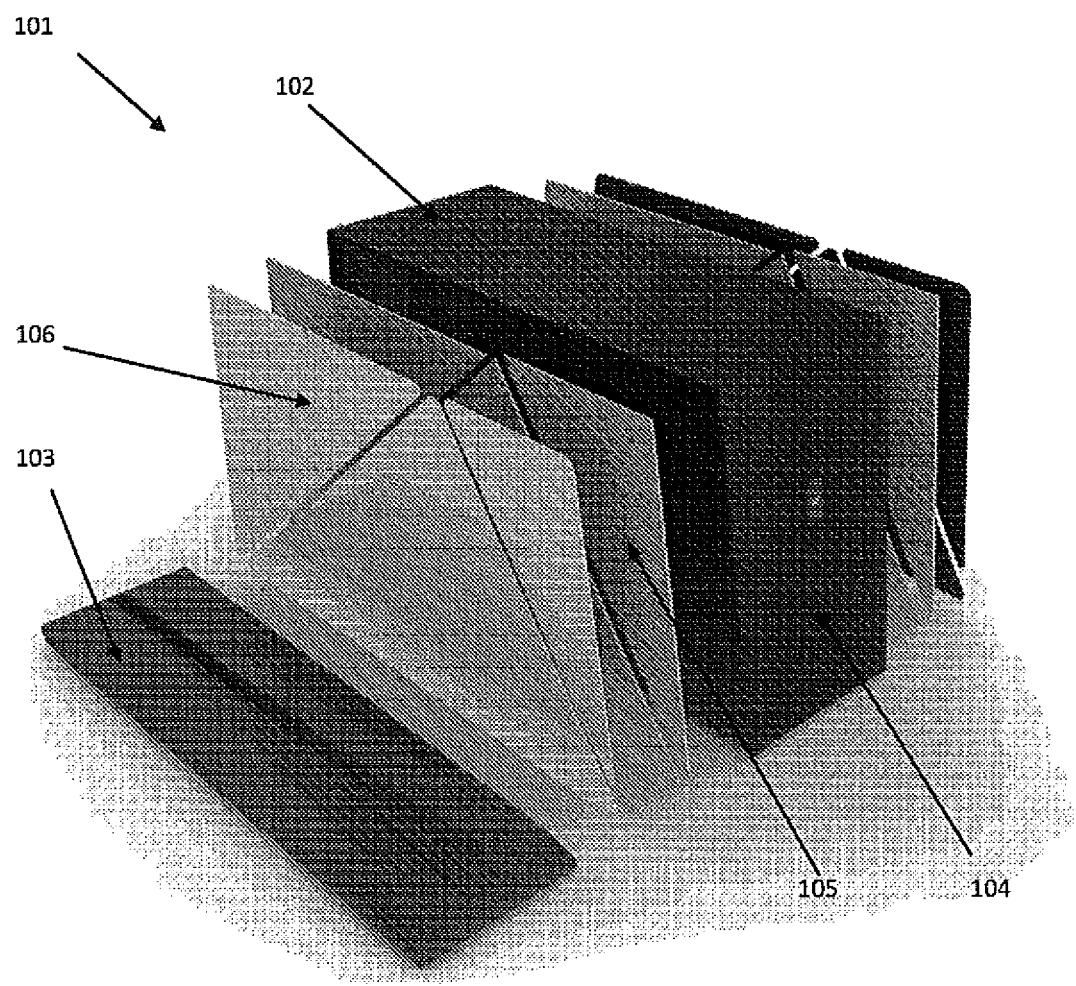
FIG. 4 is a top perspective exploded view of an alternative embodiment of an apparatus for storing a two wheeled vehicle.

FIG. 4 shows an alternative embodiment of an apparatus 101 for storing a two wheeled vehicle. Like the previously described embodiment the apparatus 101 has a housing 102 with a base support bracket (not visible), a base support/tray 103, a wheel wedge (not visible), door 104 and housing to door connection (not visible) and six inner panels 105 which are attached to the inner side walls of the housing. The apparatus also has six (three on each side) removable and replaceable (i.e. they releasably engage with the outer side walls housing with adhesives, bolts, screws or the like) outer panels 106. Users are able to customize their apparatus 101 by choosing the colours and/or textures of the outer (and optionally the inner) panels 105 to match the storage surroundings of the apparatus 101.

Figure 5:
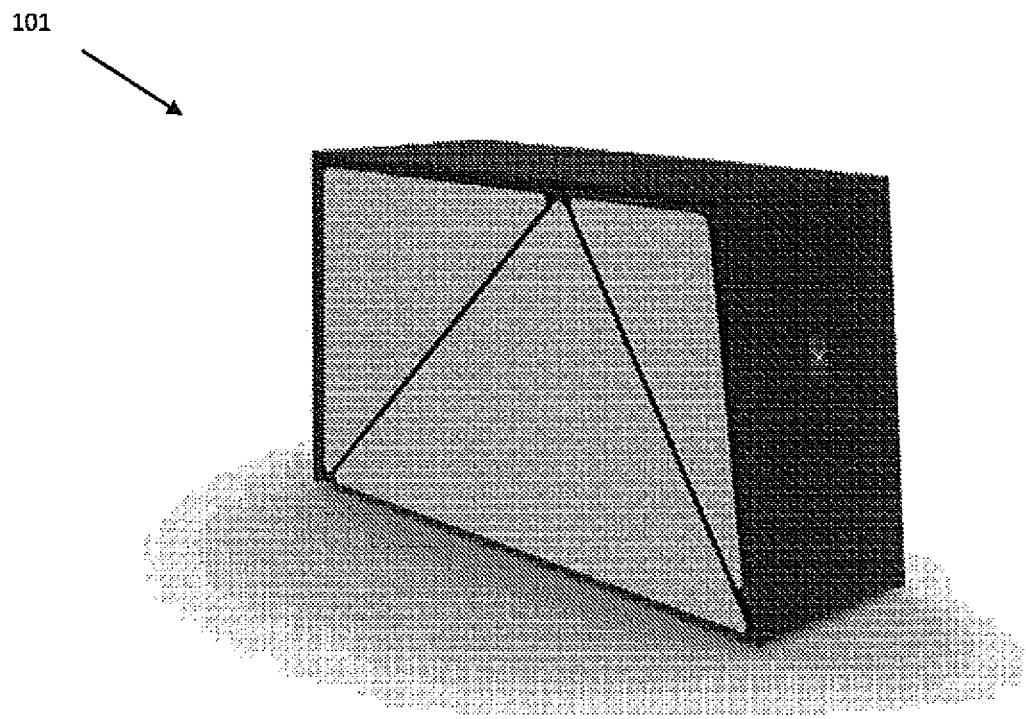
FIG. 5 is a top perspective view of the apparatus shown in FIG. 4 when assembled and in a closed configuration.
Figure 6:
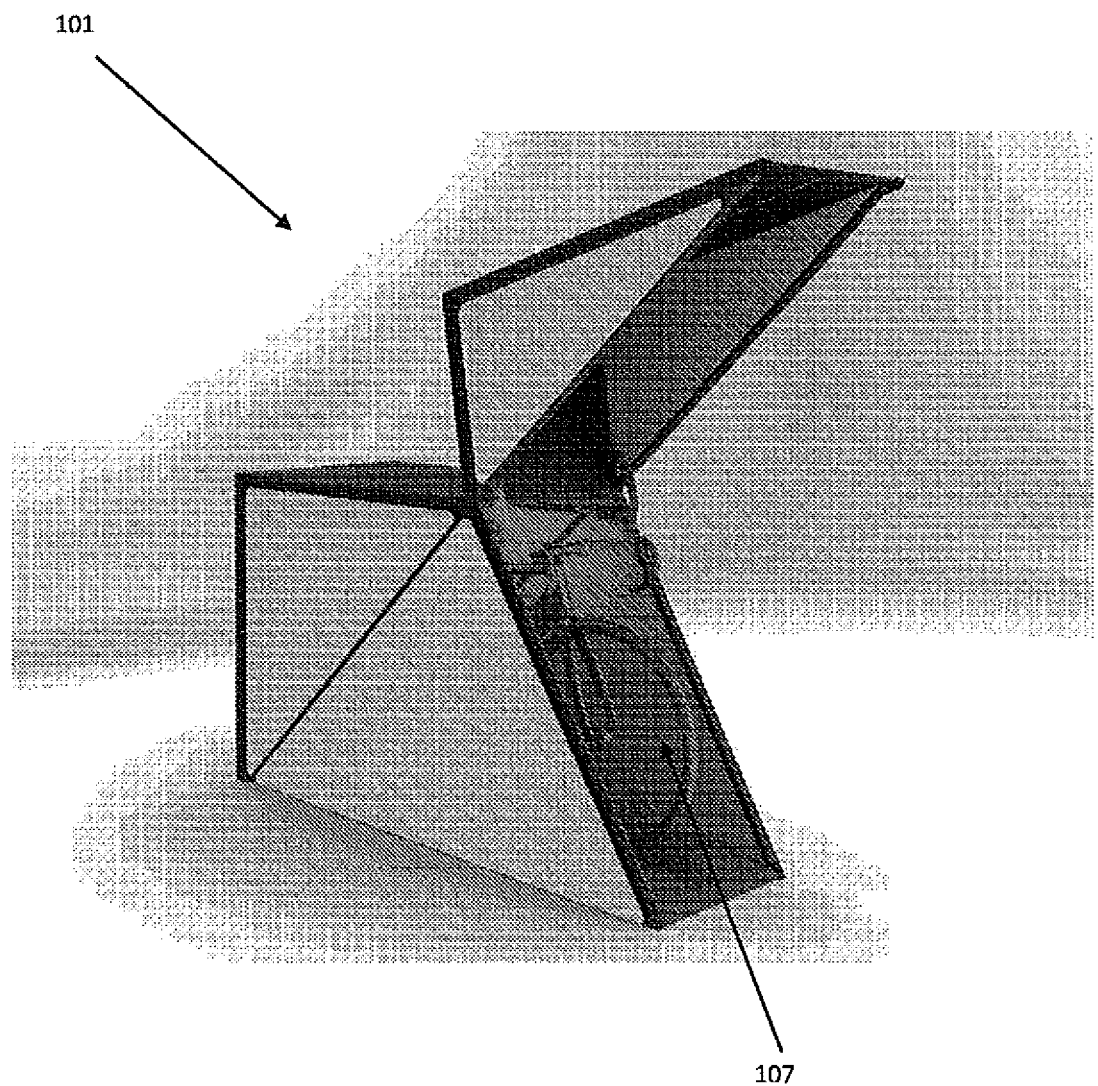
FIG. 6 is a top perspective view of the apparatus shown in FIG. 5 in an open configuration and a storing a bicycle.

FIG. 5 shows the apparatus 101 from FIG. 4 when it is assembled and in a closed or storage/transport configuration whereas FIG. 6 shows the apparatus 101 in an open configuration and housing a bicycle 107.

The housing 2, 102 (and door 7, 104) is most preferably made substantially from composite materials having a structural core (e.g. thermoplastic foam etc) preferably in a sandwich type construction (e.g. panels of foam and/or other suitable materials) designee to increase stiffness and reduce the weight of the structure. The core which is also preferably compatible with black surfaces under the sun is covered on both sides with a skin such as E-glass/UV stabilized epoxy/ protective coat (e.g. gelcoat or clear carbon) and the components are bonded using a UV stabilized epoxy resin. The protective coat enhances durability of the apparatus 1, 101 in outdoor environments. It will also be appreciated that housing 2, 102 (and door 7, 104) can be made in a number of different ways e.g. infusion, RTM light, press moulding etc. Below are some examples of the materials that can used to construct the housing 2, 102 and door 7, 104 and laminates used on the housing 2, 102, and door 7, 104.

FIBRE MATERIAL PROPERTIES

| STYLE | DESCRIPTION | FIBRE DIRECTION (WARP) | CONSTRUC- TION (%) | METHOD | RESIN TYPE | FIBER WEIGHT FRAC- TION (%) | FIBRE VOLUME FRAC- TION (%) | CURED PLY THICK- NESS (mm) | STIFF- NESS WARP (GPA) | FAILURE TEN WARP (%) | STRAIN COMP WARP (%) |
|---|---|---|---|---|---|---|---|---|---|---|---|
| XE400 | 400 g/m2 E-GLASS Stitched biaxial | ±45 | 50/50 | INFUSED | LT-EPOXY | 65% | 46% | 0.33 | 9.7 | 1.51 | 1.51 |
| QE600 | 625 g/m2 E-GLASS Stitched quadraxial | 0/±45/90° | 25/25/25/25 | WET VAC MFV | LT-EPOXY | 61% | 42% | 0.57 | 15.2 | 1.50 | 1.15 |
| RE200 | 200 g/m2 E-GLASS Balanced woven 0/90 | 0/90° | 50/50 | WET VAC MFV | LT-EPOXY | 60% | 41% | 0.19 | 18.6 | 1.50 | 1.15 |
| RC200 | 200 g/m2 HIGH STRENGTH CARBON Balanced woven 0/90 | 0/90° | 50/50 | WET VAC MFV | LT-EPOXY | 51% | 41% | 0.27 | 49.1 | 0.96 | 0.64 |
| UC300 | 300 g/m2 HIGH STRENGTH CARBON Unidirectional | 0° | 100 | INFUSED | LT-EPOXY | 65% | 55% | 0.30 | 125.5 | 1.02 | 0.66 |

| CORE MATERIAL PROPERTIES | | | | | | | | |
| --- | --- | --- | --- | --- | --- | --- | --- | --- |
| | | | SHEAR STRENGTH | | COMPRESSIVE MODULUS | | SHEAR MODULUS | |
| STYLE | DESCRIPTION | THICKNESS (mm) | 0° (MPa) | 90° (MPa) | 0° (MPa) | 90° (MPa) | 0° (MPa) | 90° (MPa) |
| G-PET-110 | 114 kg/m3 CROSS-LINKED | VARIES | 0.8 | 0.8 | 77 | 77 | 27 | 27 |
| MBO | 65 kg/m3 LINEAR | VARIES | 0.6 | 0.6 | 31 | 31 | 20 | 20 |

| BIKE BOX LAMINATE | | | | | | | | | |
| --- | --- | --- | --- | --- | --- | --- | --- | --- | --- |
| LAYER No. | MATERIAL | FIBRE DIRECTION | RESIN TYPE | FIBRE WEIGHT FRACTION | BODY & DOOR LAMINATE | SINGLE SKIN LAMINATE | AB INDICATED | CURED THICKNESS (mm) | CURED WEIGHT (kg/m2) |
| 1 | 1 × RE200 | 0/90° | LT-EPOXY | 60% | ✓ | ✓ | | 0.18 | 0.2 |
| 2 | 1 × QE600 | 0/+45/−45/90° | LT-EPOXY | 61% | ✓ | ✓ | | 0.57 | 1.0 |
| 3 | ADDITIONAL LAMINATE | — | — | — | | | ✓ | — | — |
| 4 | 250 g/m2 CORE PRIMING | — | — | — | ✓ | | | — | 0.3 |
| 5 | M60-10mm | — | — | — | ✓ | | | 10.00 | 0.7 |
| 6 | 250 g/m2 CORE PRIMING | — | — | — | ✓ | | | — | 0.3 |
| 7 | ADDITIONAL LAMINATE | — | — | — | | | ✓ | — | — |
| 8 | 1 × QE600 | 0/+45/−45/90° | LT-EPOXY | 61% | ✓ | ✓ | | 0.57 | 1.0 |
| ESTIMATED O/S THICKNESS (mm) | | | | | 0.8 | 0.8 | — | | |
| ESTIMATED I/S THICKNESS (mm) | | | | | 0.6 | 0.6 | — | | |
| ESTIMATED TOTAL THICKNESS (mm) | | | | | 11.3 | 1.2 | — | | |
| ESTIMATED TOTAL CURED WEIGHT (kg/m2) | | | | | 3.5 | 2.4 | — | | |

Figure 7:
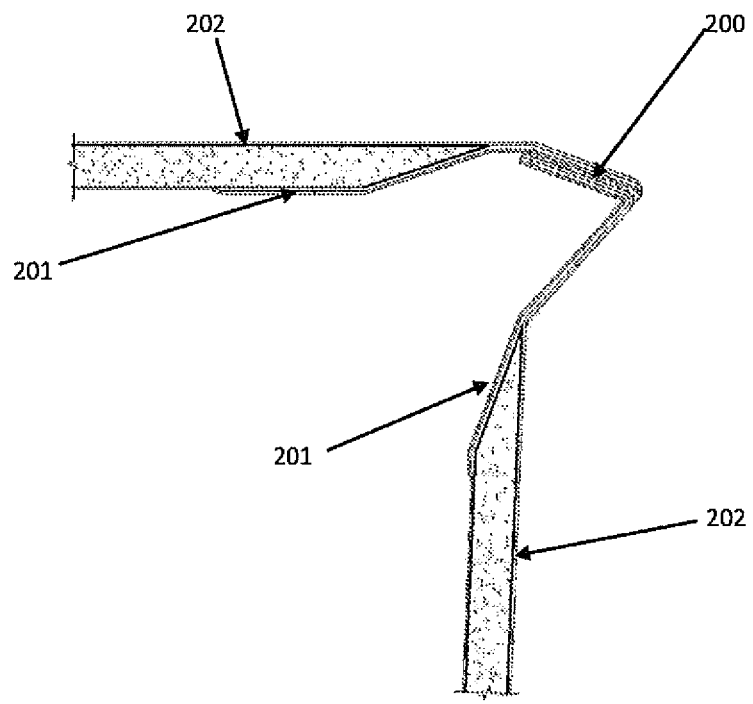
FIG. 7 is a cross sectional view of a top to side panel joint which form part of an alternative embodiment of an apparatus for storing a two wheeled vehicle.
Figure 8:
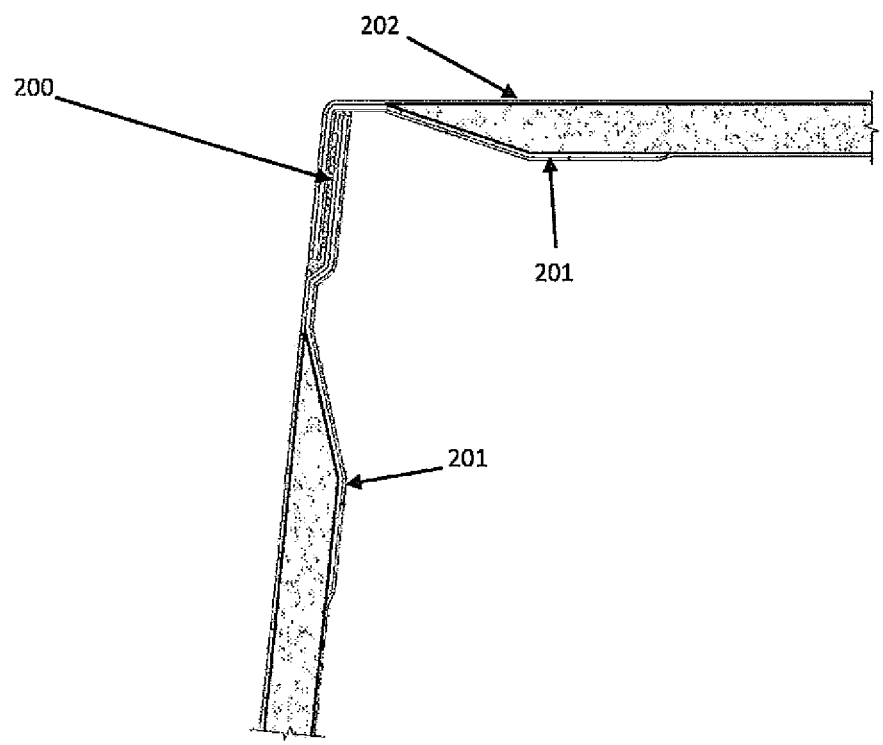
FIG. 8 is a cross sectional view of a top to end panel joint which form part of an alternative embodiment of an apparatus for storing a two wheeled vehicle.
Figure 9:
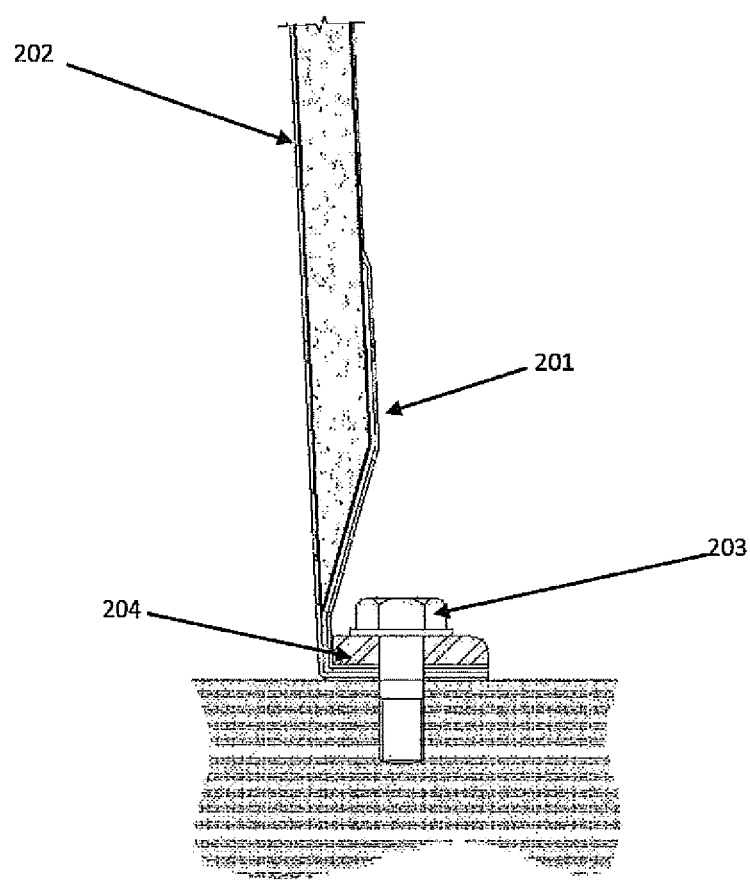
FIG. 9 is a cross sectional view of a lower edge of a panel of housing which forms part of an alternative embodiment of an apparatus for storing a two wheeled vehicle.
Figure 10:
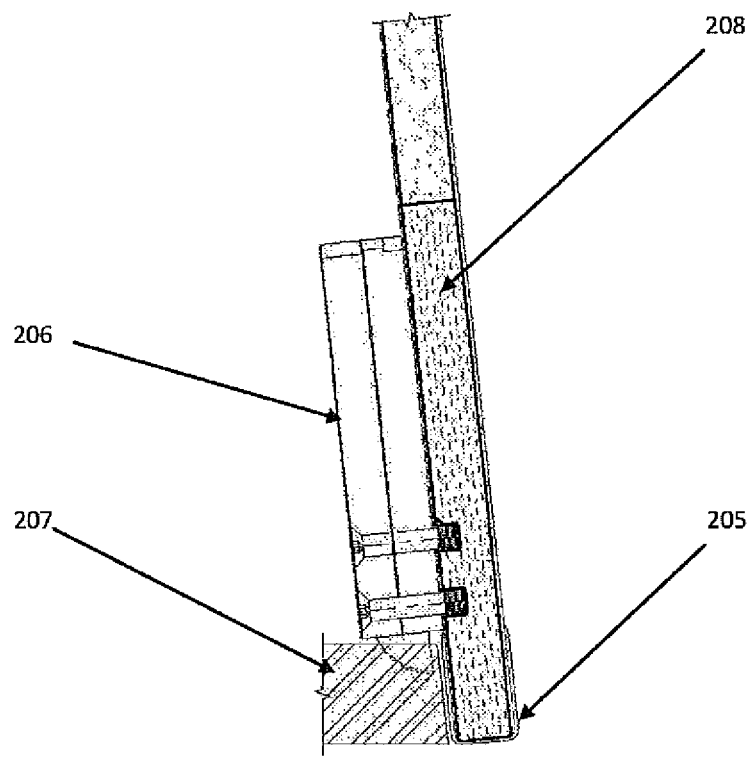
FIG. 10 is a cross sectional view of the lower edge of a door and a locking assembly which form part of an alternative embodiment of an apparatus for storing a two wheeled vehicle.
Figure 11:
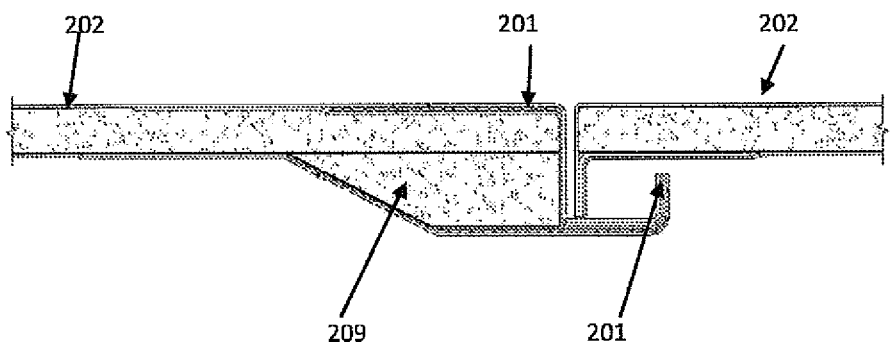
FIG. 11 is a cross sectional view of a top panel with guttering and a door which form part of an alternative embodiment of an apparatus for storing a two wheeled vehicle.
Figure 12:
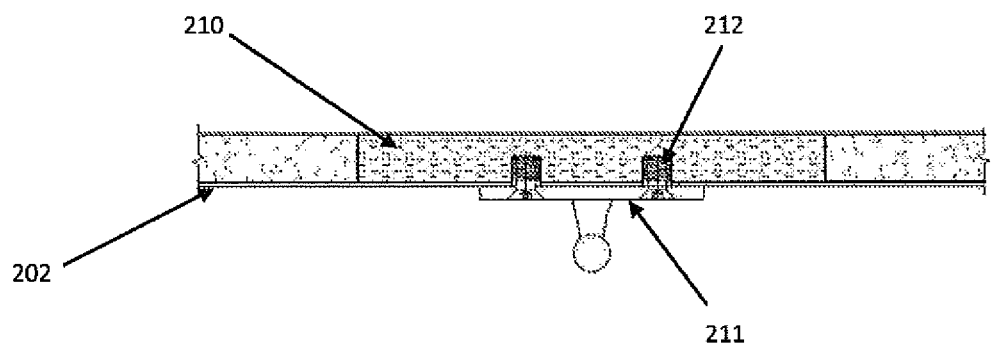
FIG. 12 is a cross sectional view of a panel of housing with a replacement core which form part of an alternative embodiment of an apparatus for storing a two wheeled vehicle.

In the most preferred embodiment of the invention the housing 2, 102 (and door 7, 104) are constructed from a number of panels (e.g. side panels, top panel, end panel and door panel) and these can be shipped flat and assembled by an approved contractor on site. The panels are designed to be manufactured flat and bonded together with the help of flange details and a structural adhesive. FIG. 7 shows an example of a top to side panel join detail and FIG. 8 shows an example of a top end panel join detail and both show the use of a structural adhesive 200 such as SP340 to bond the panels together. The panels also have additional laminate 201 in way of single skin bonding flanges additional to housing (or body) and door laminate 202 on the panels. FIG. 9 shows a housing panel lower edge which also has additional laminate 201 and a bolt 203 and backing plate 204 to secure the apparatus to a structure. FIG. 10 shows the lower edge of a door according to one embodiment. In this embodiment the door has a capping laminate 205 and an alternative locking mechanism 206 and a steel bottom frame 207 for the locking mechanism. The door in this embodiment also has a core replacement 208 which allows for the locking mechanism connection. FIG. 11 shows the gutter of the top of the open edge of the housing in more detail. The top panel has additional laminate 201 and an area of shaped foam 209. FIG. 12 illustrates a core replacement 210 such that additional hardware/components 210 can be attached with screws/bolts 211 or the like.

Figure 13:
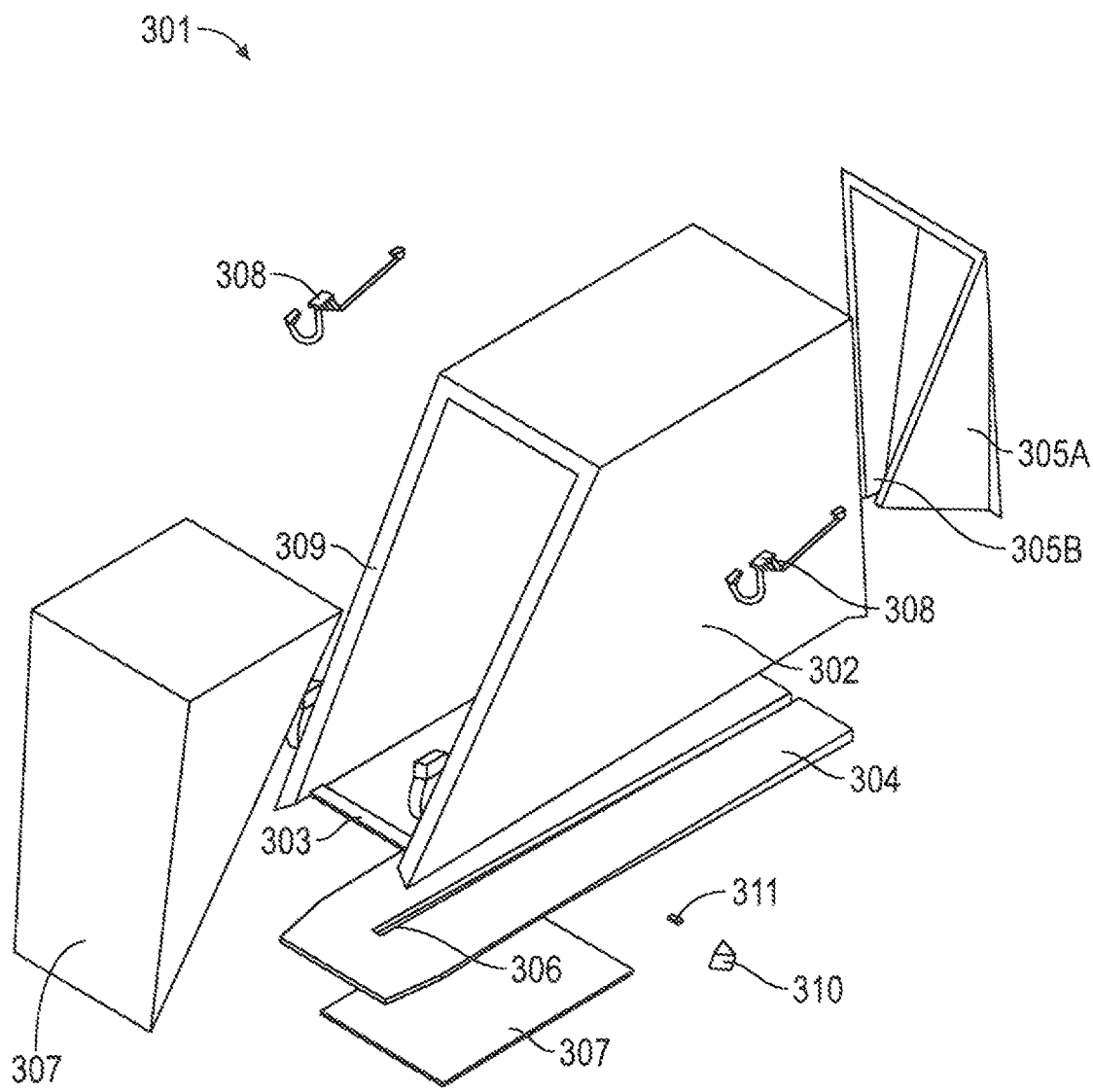
FIG. 13 is a top perspective exploded view of an alternative embodiment of an apparatus for storing a two wheeled vehicle.

FIG. 13 shows an alternative embodiment of an apparatus 301 for storing a two wheeled vehicle (not shown). As can be seen the apparatus 301 has housing 302 adapted to receive a two wheeled vehicle (not shown), In the embodiment shown the apparatus 301 stores one two wheeled vehicle however it will be appreciated that in some embodiments more than one two wheeled vehicle can be stored. The housing 302 can come in different shapes and sizes but is preferably rectangular in shape and about 1090 mm in internal height for bike clearance, 518 mm in internal width for handlebar clearance and 1820 mm in length (of the base). The housing 302 is also preferably made up of side panels, a top panel and an end panel. Although not visible the housing 302 can have feet and/or ground attachment holes. The housing 302 also has brackets or supports 303 at its base for supporting a removable base support/tray 304 (preferably female moulded and made substantially from fibreglass) which fits within the housing 302 along with a two part wheel wedge 305 (preferably female moulded and made substantially from fibreglass) which fits against the inner back end of the housing 302 when in use. The base support/tray 304 is preferably about 1957 mm in length and 518 mm in width. As can be seen the base support/tray 304 is adapted to receive (e.g. has a track or channel) a wheel or wheels or part thereof of a bicycle to help keep the bicycle securely upright when in use and stored within the housing 302. The support/tray 304 has felt three inserts 305 in the track or channel. The base support/tray 304 can come in different sizes depending on the wheel size of the two wheeled apparatus. The wheel wedge 305A is adapted to engage and secure a wheel or part thereof cf a bicycle or motorcycle to assist with securely holding the bicycle upright during storage or transport. The wheel wedge 305A can come in different sizes depending on the size of the wheel and preferably has side felt panels 305B which engage with a part of the wheel. Those skilled in the art will appreciate that other types of wheel securing means can be used instead of a wheel wedge 305A and it can be located in different positions within the housing 302. Both the wedge 305A and base support/tray 304 are preferably removable however in some embodiments they can be fixed to the housing 302. As can be seen the apparatus 301 also has a floor panel 307 (or panels).

Figure 14:
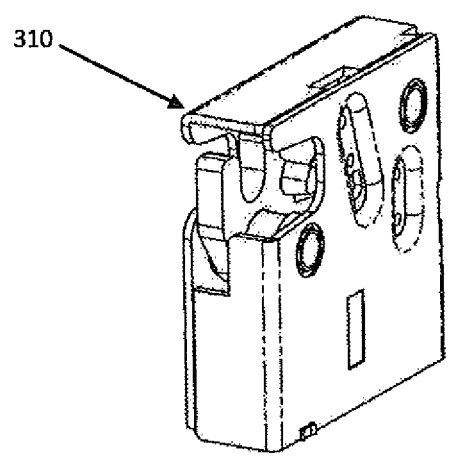
FIG. 14 is a top perspective view of a lock which forms part of an alternative embodiment of an apparatus for storing a two wheeled vehicle.
Figure 15:
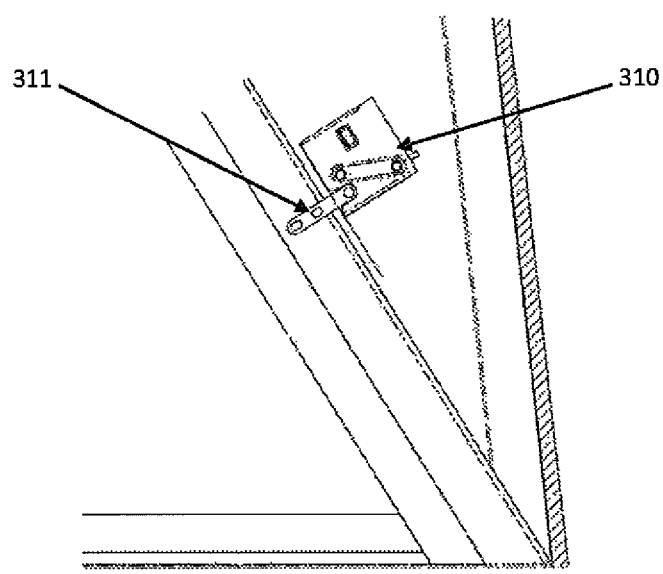
FIG. 15 is a cross sectional view of a lock and striker which form part of an alternative embodiment of an apparatus for storing a two wheeled vehicle.
Figure 16:
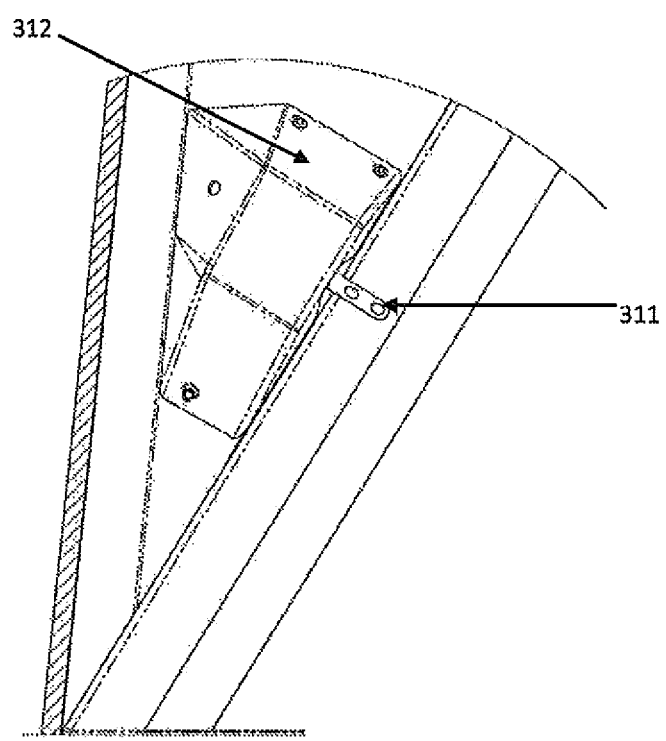
FIG. 16 is a cross sectional view of a lock cover and striker which form part of an alternative embodiment of an apparatus for storing a two wheeled vehicle.
Figure 17:
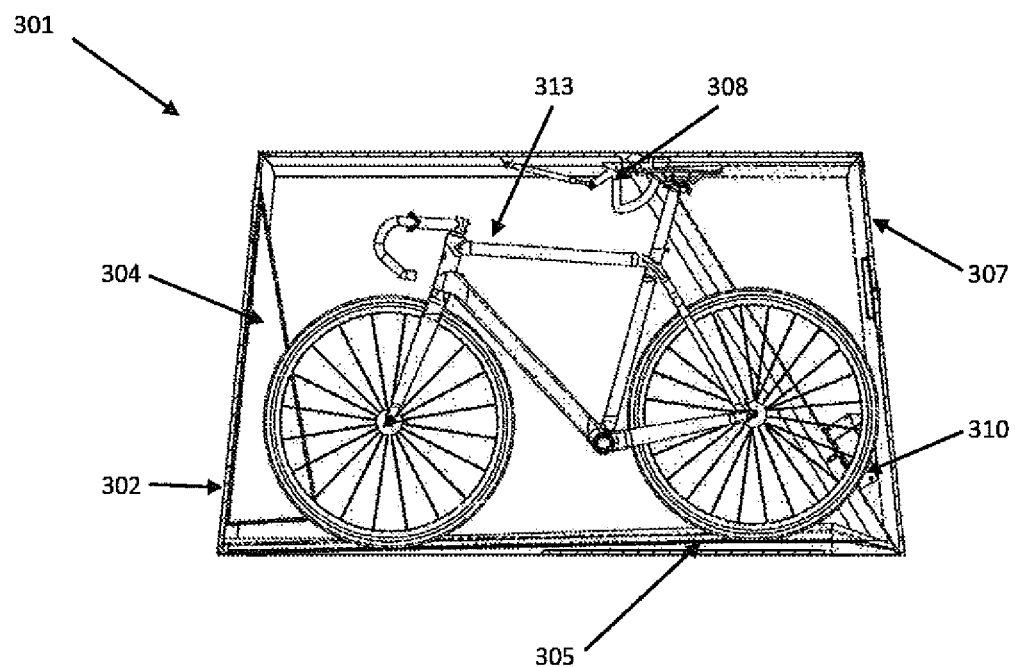
FIG. 17 is a cross sectional side view of the apparatus shown in FIG. 13 when storing a bicycle.
Figure 18:
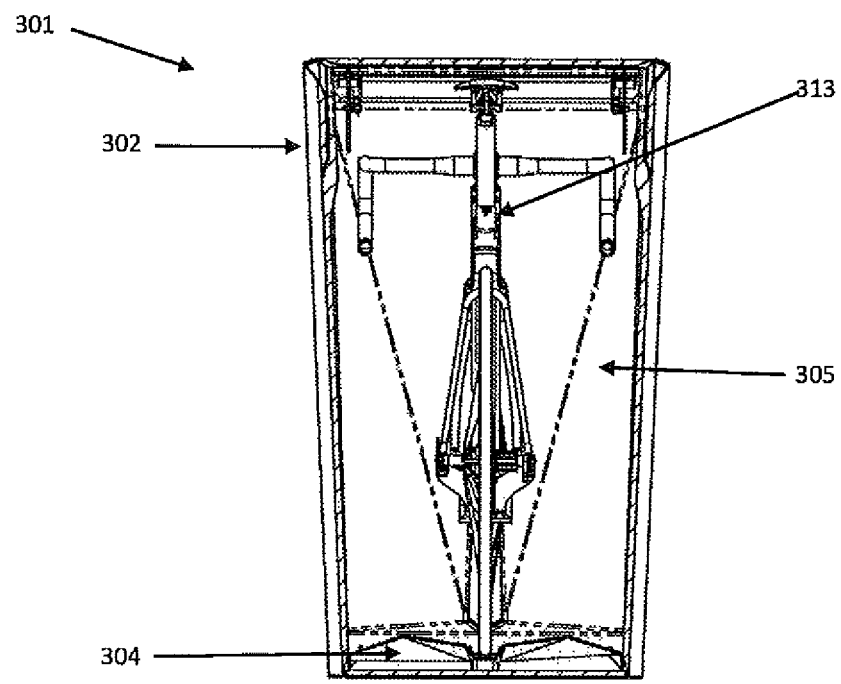
FIG. 18 is a cross sectional end view of the apparatus shown in FIG. 13 when storing a bicycle.

At the front end of the housing 302 is a door 307 which is connected to the housing 302 by a hinge assembly 308. The apparatus 301 has a housing for controls 309 and a locking assembly consisting of lock 310, a striker 311 and a lock cover (not shown) to lock the door 307 to the housing 302. FIGS. 14-16 show the lock, striker 311 and lock cover 312 in more detail. Preferably the apparatus 301 has a lock 310 on each side of the door 307 and can both be opened or closed at the same time as they are linked by a cable (not shown). The lock 310 can either be a keypad type lock or a key type lock. FIGS. 17 and 18 both show the apparatus 301 when in use and having a bicycle 313 being stored within the housing 302.

In use once the apparatus 1, 101, 301 is assembled a user is able to Open the hinged door 7, 104, 307 and push a bicycle into the housing 2, 102, 302 so that the wheels are received, guided and engaged by the base support/tray 4, 103, 304. The user can then push the bicycle all the way into the housing 2, 102, 302 until the wheel wedge 5, 305 located at the end of the housing 2, 102, 302 receives and secures a wheel of the bicycle such that the wheel is held in the upright position. The user can then shut the door 7, 104, 307 and optionally engage the lock 8, 9, 310 with the result that the bicycle is secured stored within the housing 2, 102, 302.

The apparatus 1, 101, 301 has a number of benefits and advantages over known bike storage boxes. Due to the materials used to construct the apparatus 1, 101, 301 it is light enough to be carried by two people and is still strong enough to withstand damage when knocked over, accidentally bumped etc. The outer coat on the apparatus 1, 101, 301 apart from providing protection makes the apparatus 1, 101, 301 much more aesthetically pleasing than known bike storage boxes. Additionally, the apparatus 1, 101, 301 is weather proof and/or water proof so can withstand environmental damage and the position of the locking assembly provides for flood resistance. The apparatus 1, 101, 301 can be shipped flat and assembled on site which reduces shipping costs. Furthermore, the apparatus 1, 101, 301 can be customised by a user as the outer and inner panels can be changed. The apparatus 1, 101, 301 also improves the safety of a two wheeled vehicle during transportation as any two wheeled vehicles stored within the housing are kept securely upright.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example the particular elements of the housing, door, housing to door connection, base support/tray, wheel wedge, inner and outer panels, lock assembly, battery etc may vary dependent on the particular application for which it is used without variation in the spirit and scope of the present invention.

In addition, although the preferred embodiments described herein are directed to an apparatus for storing two wheeled vehicles it will be appreciated by those skilled in the art that variations and modifications are possible within the scope of the appended claims.

The invention claimed is:

1. An apparatus for storing a two wheeled vehicle having:
   a housing adapted to receive a two wheeled vehicle and having a door connected to it at one end which is movable between a closed configuration and an open configuration, wherein the housing consists of a top panel, side wall panels and an end wall panel and wherein the panels and the door both have a structural core with sandwich type construction and wherein the core is covered on both sides with a protective skin;
   at least one base support for a two wheeled vehicle and wherein the base support is removable with respect to the housing; and
   at least one wheel securing means wherein the wheel securing means is located against a back inner wall of the housing and is removable with respect to the housing;
   the apparatus adapted such that when in use a user is able to open the door and push a two wheeled vehicle into the housing such that the base support receives, guides and engages parts of the wheels of the vehicle and the wheel securing means engages and secures part of a wheel with the result that the vehicle is securely held upright during storage in the housing.

2. An apparatus according to claim 1, wherein the base support has a wheel engaging channel.

3. An apparatus according to claim 1, wherein the base support has a wheel engaging channel and has felt inserts in the wheel engaging channel.

4. An apparatus according to claim 1, wherein the housing has least one bracket adapted to support the base support.

5. An apparatus according to claim 1, wherein the wheel securing means is a two part wheel wedge.

6. An apparatus according to claim 1, wherein the wheel securing means is a two part wheel wedge and wherein the wheel wedge has felt inserts on its side walls.

7. An apparatus according to claim 1, having a locking means adapted to lock the door to the housing.

8. An apparatus according to claim 1, wherein the housing consists of a top panel, side wall panels and an end wall panel and wherein the panels and the door both have a structural core with sandwich type construction and wherein the core is covered on both sides with a protective skin and wherein the structural core is made substantially from thermoplastic foam.

9. An apparatus according to claim 1, wherein the housing consists of a top panel, side wall panels and an end wall panel and wherein the panels and the door both have a structural core with sandwich type construction and wherein the core, is covered on both sides with a protective skin and wherein the structural core is made substantially from thermoplastic foam and wherein the skin is made substantially from E-glass, UV stabilized epoxy, gelcoat and/or clear carbon.

10. An apparatus according to claim 1, wherein the apparatus has removable outer panels connected to an outer side wall of the housing.

11. An apparatus according to claim 1, wherein the apparatus has removable outer panels connected to an outer side wall of the housing and wherein the outer panels are adapted to releasably engage with the housing.

12. An apparatus according to claim 1, wherein the apparatus has removable panels lining an inner side wall of the housing.

13. An apparatus according to claim 1, wherein the apparatus has removable outer panels connected to an outer side wall of the housing and wherein the outer panels are adapted to releasably engage with the housing and wherein the apparatus has removable panels lining an inner side wall of the housing and wherein the inner and outer panels are made substantially from PET fibre.

14. An apparatus according to claim 1, wherein the apparatus is substantially weatherproof and/or waterproof.

* * * * *